United States Patent
Eckardt et al.

(10) Patent No.: US 9,671,053 B2
(45) Date of Patent: Jun. 6, 2017

(54) FLUID LINE

(75) Inventors: Carsten Eckardt, Bruchkoebel (DE);
Stephan Mann, Biebergemuend (DE);
Marc Rastetter, Biebergemuend (DE);
Cameron Read, Hanau (DE); Knut Seibel, Altenstadt (DE)

(73) Assignee: NORMA GERMANY GMBH, Maintal (DE)

( * ) Notice: Subject to any disclaimer, the term of this patent is extended or adjusted under 35 U.S.C. 154(b) by 870 days.

(21) Appl. No.: 13/461,293

(22) Filed: May 1, 2012

(65) Prior Publication Data

US 2012/0291881 A1 Nov. 22, 2012

(30) Foreign Application Priority Data

May 20, 2011 (DE) .................. 10 2011 102 148

(51) Int. Cl.
 *F16L 53/00* (2006.01)
(52) U.S. Cl.
 CPC .......... *F16L 53/008* (2013.01); *F16L 53/001* (2013.01); *F01N 2610/10* (2013.01); *Y10T 29/49826* (2015.01); *Y10T 137/6606* (2015.04)
(58) Field of Classification Search
 CPC ....... F16L 53/001; F16L 53/008; F24H 1/009; F01N 2610/10; F01N 2610/105
 USPC ........................................................ 392/485
 See application file for complete search history.

(56) References Cited

U.S. PATENT DOCUMENTS

| | | |
|---|---|---|
| 1,905,733 A | 4/1933 | Moore |
| 2,141,797 A | 12/1938 | Minella |
| 3,894,302 A | 7/1975 | Lasater |
| 5,182,792 A | 1/1993 | Goncalves |
| 6,944,394 B2 * | 9/2005 | Long et al. .................. 392/485 |
| 7,991,273 B2 | 8/2011 | Sonderegger et al. |
| 2005/0016757 A1 | 1/2005 | Schwamborn et al. |
| 2005/0167134 A1 * | 8/2005 | Charron ................... H05B 3/56 174/36 |
| 2006/0252292 A1 | 11/2006 | Sonderegger et al. |

(Continued)

FOREIGN PATENT DOCUMENTS

| | | |
|---|---|---|
| CN | 1926372 | 3/2007 |
| CN | 101346575 | 1/2009 |
| CN | 101606014 | 12/2009 |

(Continued)

OTHER PUBLICATIONS

Korean Office action in counterpart application No. 10-2012-0051105, dated Sep. 17, 2013, along with a partial english translation thereof.

(Continued)

*Primary Examiner* — Kevin Murphy
(74) *Attorney, Agent, or Firm* — Greenblum & Bernstein, P.L.C.

(57) ABSTRACT

A fluid line includes a pipe, a connector having a pipe connection arranged at one end of the pipe, and a through-channel through the connector, wherein the pipe connection surrounds a portion of the through-channel, and a heater structured and arranged within the pipe and the connector to heat at least a portion of the pipe and at least a portion of the connector. A flow cross section of the through-channel section at least on a part of its length is no more than 60% of a flow cross section of the pipe.

20 Claims, 2 Drawing Sheets

(56) References Cited

U.S. PATENT DOCUMENTS

| | | | |
|---|---|---|---|
| 2009/0034949 A1 | 2/2009 | Sawada et al. | |
| 2010/0193530 A1 | 8/2010 | Leonard et al. | |

FOREIGN PATENT DOCUMENTS

| | | |
|---|---|---|
| CN | 201680154 | 12/2010 |
| DE | 3414284 | 10/1985 |
| DE | 202008003270 | 10/2009 |
| EP | 0068688 | 1/1983 |
| EP | 1070642 | 1/2001 |
| EP | 1484945 | 12/2004 |
| FR | 2924786 | 6/2009 |
| GB | 2100559 A | 12/1982 |
| JP | S 582463 | 1/1983 |
| JP | S 60180982 | 11/1985 |
| JP | 05-079593 | 3/1993 |
| JP | 2010-501799 | 1/2010 |
| RU | 2342807 | 4/2006 |
| WO | 2007/073286 | 6/2007 |
| WO | WO2008/023021 | 2/2008 |

OTHER PUBLICATIONS

Japanese Office action in counterpart application No. 2012-112358, dated Aug. 27, 2013, along with a partial english translation thereof.
Russian Office Action in related application No. 2012120425/06, dated Feb. 26, 2013 (with partial English-language translation).
Chinese Office Action in related application No. 201210141697.5, dated Jan. 27, 2014 (with partial English-language translation).
Japanese Office Action in related application No. 2012-112357, dated Aug. 27, 2013 (with partial English-language translation).
Korean Office Action in related application No. 10-2012-51104, dated Sep. 17, 2013 (with partial English-language translation).
Korean Office Action in related application No. 10-2012-0051103, dated Feb. 14, 2014 (with English-language translation).
Chinese Office Action in related application No. 201210124052.0, dated Dec. 25, 2013 (with partial English-language translation).
Japanese Office Action in related application No. 2012-112360, dated Aug. 27, 2013 (with partial English-language translation).
Korean Office Action in related application No. 10-2012-0051103, dated Sep. 17, 2013 (with partial English-language translation).
Russian OA in related application No. 2012120423/06 dated May 30, 2013 (with partial English-language translation).
Chinese Office action in counterpart application No. 201210141654.7, dated Dec. 4, 2013, along with English-language translation thereof.
E.P.O.Search report in related Application No. 12001339.6 (with partial English-language translation); mail date is Oct. 26, 2012.
E.P.O. Search report in related Application No. 12001338.8 (with partial English-language translation); mail date is Oct. 26, 2012.
German Office Action in related Application No. 102001102244.2 (with partial English-language translation); mail date is May 15, 2012.
E.P.O. Search report in related Application No. 12001337.0 (with partial English-language translation); mail date is Oct. 10, 2012.
German Office Action in related application No. 10-2011 102 148.9, dated Oct. 13, 2015.

\* cited by examiner

FLUID LINE

CROSS-REFERENCE TO RELATED APPLICATIONS

The present application claims priority under 35 U.S.C. §119 of German Patent Application No. 10 2011 102 148.9, filed on May 20, 2011, the disclosure of which is expressly incorporated by reference herein in its entirety.

BACKGROUND OF THE INVENTION

1. Field of the Invention

The invention relates to a fluid line with a pipe, a connector that has a pipe connection and that is arranged at one end of the pipe, and a heating device that heats at least a part of the pipe and at least a part of the connector, wherein the pipe connection surrounds a part of a through-channel through the connector.

The invention is explained below based on a fluid line that is used to transport urea from a storage container to a point of consumption. Urea is used with diesel engines in order to reduce the emission of nitrogen oxides.

2. Discussion of Background Information

When a fluid line of this type is installed in a motor vehicle, there is the danger at low outdoor temperatures that the urea will freeze in the fluid line so that it can no longer flow. It is therefore known to heat the fluid line. Not only the pipe is heated thereby, an attempt is also made to heat the connector.

Urea solidifies at a temperature of minus 11° C., that is, freezes, and prevents the further flow of urea from a tank to a point of consumption, for example, an injection pump. In order to meet certain standards, the heating device must be able to thaw the urea in the fluid line within a certain time. This requires a certain heating power, so that the heating device has to be sized correspondingly large. This increases the mass of the vehicle and increases the energy consumption.

While the pipe generally has a certain flexibility so that it can generally absorb the increase in volume associated with the freezing of the liquid inside the fluid line without any difficulty, the connector is not usually so resilient. There is therefore a danger of the connector being damaged due to the freezing of the liquid.

SUMMARY OF THE INVENTION

The aim of the invention is to disclose a heatable fluid line, which is quickly ready for operation even at cold outdoor temperatures.

This aim is attained with a fluid line of the type mentioned at the outset in that the through-channel, at least on a part of the through-channel's length has a flow cross section that is no more than 60% of the flow cross section of the pipe.

The liquid flowing through the fluid line can at most fill the flow cross section. If the flow cross section inside the connector is smaller, then at this point there is also less liquid present that can freeze. The smaller the volume of the liquid that can freeze, the quicker this liquid volume can be thawed. Furthermore, the increase in volume during the freezing of the liquid is also dependent on the liquid volume. Thus a smaller volume expands much less markedly than a larger volume. The danger of damage to the connector by liquid that expands during freezing is therefore kept lower.

Preferably, the flow cross section of the through-channel on the part of the length is no more than 50% of the flow cross section of the pipe. The flow cross section of the through-channel on the part of the length at issue can therefore be made only half the size of the flow cross section of the pipe. The volume of the liquid that can freeze in the connector and has to be thawed is thus kept small thereby. At the same time, however, a sufficient flow cross section is provided so that the liquid can also flow through the connector without appreciable resistance.

Preferably, the heating device is embodied as a heater rod, which is guided out of the pipe into the pipe connection of the connector and reduces the flow cross section of the through-channel in the interior of the pipe connection. The heater rod thus fulfills two functions. On the one hand, the heater rod is able to generate heat that can then be introduced directly into the liquid present in the fluid line. It is therefore not necessary for this heat also to penetrate the material of the connector or of the pipe. On the other hand, the heater rod fills a part of the free space in the interior of the connector. Where the heater rod is present, no liquid can be present and freeze.

Preferably, the heater rod is embodied in a bendable manner. The heater rod thus has the advantage that it can also be inserted into a pipe that does not have a straight course. On the other hand, this embodiment has the advantage that the heater rod can be guided laterally out of the connector when the through-channel has a straight-line course. In this case, although the heater rod does not fill the entire through-channel in part, but only a part of the length of the through-channel, this is not critical, since the heater rod needs only to thaw a relatively small volume of liquid. As soon as the liquid is thawed, it can transport heat to frozen regions of the liquid so that a correspondingly short thawing can be achieved.

Preferably, the connector has a heater outlet channel that forms an angle unequal to 0° with the through-channel, wherein a ramp element is arranged in the through-channel, which ramp element has a guide surface pointing out of the through-channel to the heater outlet channel and reduces the cross section of the through-channel on the other side of the pipe connection. The ramp element also has two functions. When the heater rod is guided through the pipe connection into the interior of the connector, it is deflected by the guide surface into the heater outlet channel so that it does not reach a connection geometry and there impede the production of a connection between the connector and a counter element. On the other hand, the ramp element also contributes to a reduction in volume in the interior of the connector. Where the ramp element is located there can no longer be any liquid that can freeze. The ramp element is located at a position at which the heater rod has already been deflected so that it is no longer directly available for heating the liquid in the interior of the connector. Accordingly, the ramp element also establishes favorable conditions with respect to the reduction of the liquid volume to be heated.

Preferably, the ramp element fills the through-channel in a plane that is spanned by the through-channel and the heater outlet channel and in a plane perpendicular thereto leaves a flow cross section free in the through-channel. The through-channel is divided into two halves as it were by the ramp element, which halves are located parallel to the flow direction on the left and on the right of the through-channel. Here a sufficient flow cross section is available for the liquid. However, in between the flow channel is filled completely by the ramp element so that no liquid can collect here.

Preferably, the ramp element has a width that corresponds to no more than 50% of the largest width of the through-channel in the region of the ramp element. Thus a further 50% of the width remains free for the flow of the liquid, that is, is not blocked by the ramp element. Even when the cross section of the through-channel is circular and the ramp element is arranged in the region of the largest diameter, sufficient cross-sectional area is available to allow the liquid to flow through the connector. The width of no more than 50% however is sufficient to provide a sufficiently wide guide surface for the tip of the heater that is to be deflected by the ramp element to the heater outlet channel.

Preferably, the ramp element is embodied in one piece with the connector. The ramp element can be injected in one piece with the connector, for example, when the connector is embodied as an injection molded part. Thus, for the production and the insertion of the ramp element into the connector, additional expenditure is virtually no longer necessary. At the same time the ramp element is connected to the housing at both ends of the guide surface so that the guide surface is held with sufficient forces so far that the tip of the heater can slide along it without the guide surface being displaced. In particular the guide surface cannot tilt such that the guidance of the tip of the heater into the heater outlet channel is interrupted.

Preferably, a gap with a maximum extension of 1 mm perpendicular to an axis of the through-channel is provided between a circumferential wall delimiting the through-channel inside the pipe connection and the heater rod. Thus a liquid layer between the heater rod and the pipe connection, or a corresponding ice layer, has a maximum thickness of 1 mm. Therefore the ice layer can be thawed correspondingly quickly.

Aspects of the disclosure are directed to a fluid line comprising a pipe, a connector having a pipe connection arranged at one end of the pipe, and a through-channel through the connector, wherein the pipe connection surrounds a portion of the through-channel, and a heater structured and arranged within the pipe and the connector to heat at least a portion of the pipe and at least a portion of the connector. A flow cross section of the through-channel at least on a part of its length is no more than 60% of a flow cross section of the pipe.

In further embodiments, the flow cross section of the through-channel on the part of the length is no more than 50% of the flow cross section of the pipe.

In additional embodiments, the heater is embodied as a heater rod, which extends out of the pipe into the pipe connection of the connector and defines the flow cross section at least in the portion of the through-channel surrounded by the pipe connection.

In yet further embodiments, the heater rod is embodied in a bendable manner.

In embodiments, the connector further comprises a heater outlet channel that forms an angle unequal to 0° with the through-channel, and a ramp element having a guide surface arranged in the through-channel. The guide surface points out of the through-channel to the heater outlet channel, and reduces the cross section of the through-channel on another side of the pipe connection.

In further embodiments, the ramp element is arranged to span the through-channel in a plane passing through the through-channel and the heater outlet channel, while defining a flow cross-section in the through-channel in a plane perpendicular to the plane passing through the through-channel and the heater outlet channel.

In additional embodiments, the ramp element comprises a width that corresponds to no more than 50% of a largest width of the through-channel in a region of the ramp element.

In yet further embodiments, the ramp element is embodied in one piece with the connector.

In embodiments, a gap with a maximum extension of 1 mm perpendicular to an axis of the through-channel is defined between a circumferential wall delimiting the through-channel within the pipe connection and the heater rod.

In further embodiments, the connector further comprises a heater outlet channel that forms an angle equal to 0° with the through-channel.

Aspects of the disclosure are directed to a method of assembling a fluid line having a pipe, a connector having a pipe connection arranged at one end of the pipe, and a through-channel through the connector, wherein the pipe connection surrounds a portion of the through-channel, and a heater structured and arranged to heat at least a portion of the pipe and at least a portion of the connector, wherein the pipe has a pipe diameter, the through-channel has an inner diameter, and the heater has one of a heater diameter and a heater width. The method comprises selecting at least one of the pipe diameter, the through-channel inner diameter, and the one of the heater diameter and the heater width, such that a flow cross section of the through-channel at least on a part of its length is no more than 60% of a flow cross section of the pipe. The method additionally comprises inserting the heater into the through-channel, and attaching the pipe to the pipe connection.

In further embodiments, the flow cross section of the through-channel on the part of the length is no more than 50% of the flow cross section of the pipe.

In additional embodiments, the heater is embodied as a heater rod, which extends out of the pipe into the pipe connection of the connector and defines the flow cross section at least in the portion of the through-channel surrounded by the pipe connection.

In yet further embodiments, the heater rod is embodied in a bendable manner.

In embodiments, the connector further comprises a heater outlet channel that forms an angle unequal to 0° with the through-channel, and a ramp element having a guide surface arranged in the through-channel. The guide surface points out of the through-channel to the heater outlet channel, and reduces the cross section of the through-channel on another side of the pipe connection.

In further embodiments, the ramp element is arranged to span the through-channel in a plane passing through the through-channel and the heater outlet channel, while defining a flow cross-section in the through-channel in a plane perpendicular to the plane passing through the through-channel and the heater outlet channel.

In additional embodiments, the ramp element comprises a width that corresponds to no more than 50% of a largest width of the through-channel in a region of the ramp element.

In yet further embodiments, the ramp element is embodied in one piece with the connector.

In embodiments, a gap with a maximum extension of 1 mm perpendicular to an axis of the through-channel is defined between a circumferential wall delimiting the through-channel within the pipe connection and the heater rod.

In further embodiments, the connector further comprises a heater outlet channel that forms an angle equal to 0° with the through-channel.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
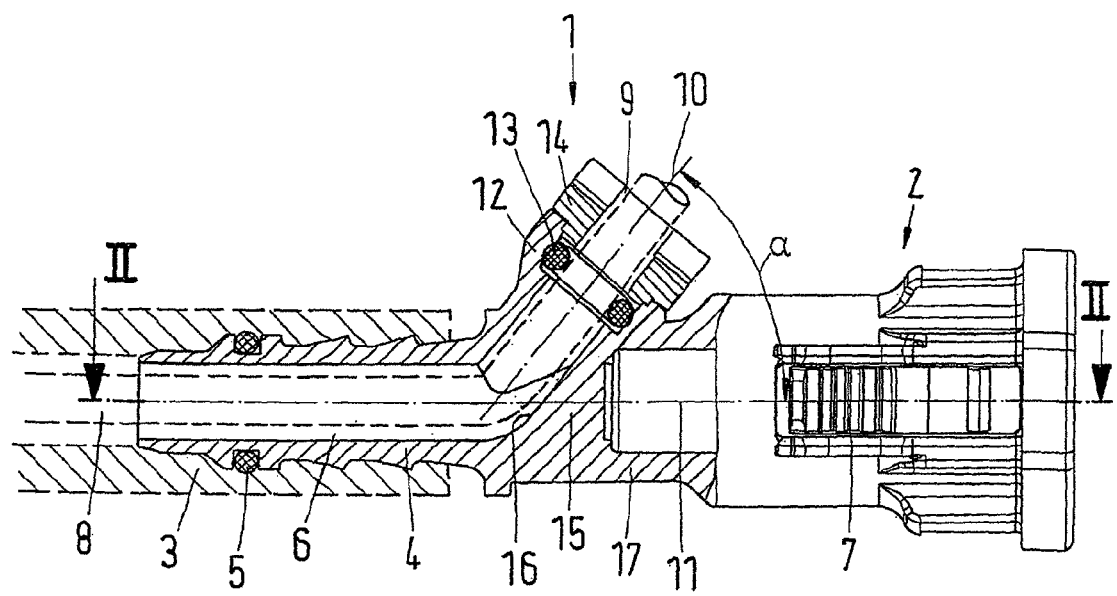
FIG. 1 illustrates a diagrammatic longitudinal section through a connector with a connected pipe.

FIG. 1 shows a heatable fluid line 1 with a connector 2 and a pipe 3. The pipe is flexible. It can be made of an extruded plastic or also of a hose material. A hose is also to be covered by the term "pipe" below.

The pipe 3 is pushed onto a pipe connection 4 of the connector and sealed there with an O-ring 5. The pipe connection 4 has a pine-tree profile on its outside. If necessary, the pipe 3 can also be held on the pipe connection 4 with the aid of a clamping element, for example a hose clamp or the like.

Figure 2:
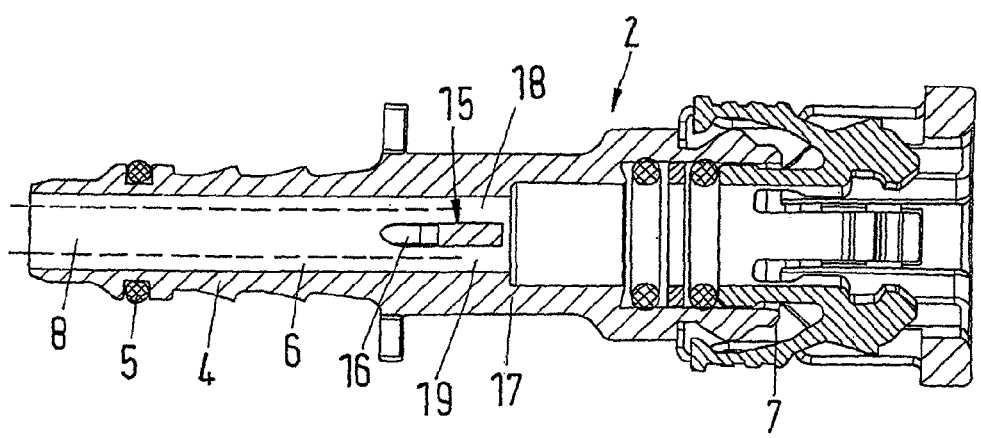
FIG. 2 illustrates a section II-II according to FIG. 1.

A through-channel 6 is defined through the pipe connection 4, which through-channel 6 runs in a straight line through the entire connector and, as can be seen in FIG. 2, is guided up to a connection geometry 7. The connector 2 can be attached to a pipe connection of another line, of a tank or of an assembly with the connection geometry 7. The precise shape of the connection geometry 7 is irrelevant in this case. However, it should be embodied such that a connection between the connector 2 and a pipe connection has sufficient strength and tightness.

A heater 8 shown by a dashed line is arranged in the free cross section of the pipe 3. In the present case the heater 8 is embodied as a flexible heater rod that has at least one heating conductor that is embedded in an extruded plastic material. Preferably, two heating conductors are provided which are connected to one another at an end distant from the connector 2, so that an electrical supply is necessary only at one end of the heater 8. Although the heater 8 is flexible and bendable, it has a certain inherent stiffness so that when the pipe 3 (with the heater 8 located therein) is pushed onto the pipe connection 4, the heater 8 can be pushed into the through-channel 6 in the pipe connection 4.

The heater 8 should leave the connector 2 before it reaches the connection geometry 7 in order not to disturb a connection established with the aid of the connection geometry 7. Accordingly, the connector has a heater outlet channel 9, the longitudinal axis 10 of which lies at an angle α to the longitudinal axis 11 of the through-channel 6. The angle α is greater than 0° and is preferably in the range of 20° to 80°.

The heater outlet channel 9 is arranged in a connection 12 that is aligned at the angle α to the longitudinal axis 11 of the through-channel 6. An O-ring 13 is provided in the connection 12. The O-ring 13 bears against the heater 8 in a sealing manner and prevents fluid from leaving the heater outlet channel. The O-ring 13 is held in the heater outlet channel 9 by a plug 14, which is arranged in the connection 12. However, the plug 14 merely holds the O-ring 13 in place. That is, the plug 14 does not compress the O-ring 13.

As explained above, the heater 8 has a certain inherent stiffness. Thus no auxiliary tools are necessary to deflect the heater 8, the tip of which is guided essentially along the longitudinal axis 11 through the through-channel 6, such that it exits through the heater outlet channel 9. To this end a ramp element 15 is arranged in the through-channel 6, which ramp element is discernible in particular in FIG. 2. The ramp element 15 is embodied in one piece with the connector 2. When the connector 2 is embodied as an injection molded part, the ramp element 15 is produced directly with it during the injection molding.

The ramp element 15 has a guide surface 16 that is curved, that is, embodied in a manner free from kinks. The guide surface 16 extends from the "underside" of the through-channel 6, that is, the side that lies opposite the heater outlet channel 9, up to the heater outlet channel 9 and is continued in a wall of the heater outlet channel 9. The tip of the heater 8 can thus slide along the guide surface 16 without being obstructed by steps, kinks, grooves or the like. When the heater 8 is inserted through the pipe connection 4 into the through-channel 6, the tip is deflected by the guide surface 16 of the ramp element 15 such that it automatically reaches the heater outlet channel 9.

In the plane of the sectional view according to FIG. 1, that is, in a plane that is spanned by the longitudinal axis 11 of the through-channel 6 and the longitudinal axis 10 of the heater outlet channel 9, the ramp element 15 fills the through-channel 6 completely, see FIG. 1. The ramp element 15 is thus connected at the two ends of the guide surface 16 to the housing 17 of the connector 2. There is therefore no danger of the ramp element 15 tilting when it is acted on with force by the tip of the heater 8. As can be seen in particular in FIG. 2, the ramp element 15 does not fill the through-channel 6 completely, however. In fact it leaves two flow cross sections 18, 19 free transversely to the plane shown in FIG. 1, through which the fluid can still flow during operation. The ramp element 15 reduces the free cross section of the through-channel 6 a little, but it still leaves free enough cross section for the flow of the fluid.

It is discernible that the two flow cross sections 18, 19 have a width that is smaller than the diameter of the heater 8. Accordingly, in any case it is ensured that the heater 8 is deflected by the guide surface 16 in the direction of the heater outlet channel 9 when the heater 8 is inserted into the connector 2. On the other hand, the ramp element 15 has a width that corresponds to a maximum of 50% of the largest width of the through-channel 6 in the region of the ramp element 15.

When the heater 8 does not have a circular cross section and accordingly no actual diameter, the width of the heater 8 in the width direction of the flow cross sections 18, 19 is larger than the width of the flow cross sections 18, 19, so that it is also reliably ensured in this case that the heater 8 is deflected by the ramp element 15 during insertion into the connector 2.

The production of a heatable fluid line 1 with a connector 2 of this type is relatively simple in design. The pipe 3 is pre-assembled with the heater 8 so that the heater 8 projects out of the pipe 3 with a predetermined length. Thus, before the pipe 3 is pushed onto the pipe connection 4, the heater 8 already reaches the through-channel 6 in the interior of the pipe connection 4. When the pipe 3 and the heater 8 then are moved further jointly in order to push the pipe 3 onto the pipe connection 4, the tip of the heater 8 is deflected by the guide surface 16 on the ramp element 15 so that this tip reaches the heater outlet channel 9 and can there exit from the connector 2.

Of course, it is also possible firstly to insert the heater 8 alone into the connector 2 and then to guide the pipe 3 over the heater 8 and to push it onto the pipe connection 4.

As can be seen in particular in FIG. 1, the flow cross section in the through-channel 6 inside the pipe connection 4 is markedly smaller than the corresponding flow cross section in the pipe 3. For example, if an inner diameter of the pipe 3 is assumed to be 6 mm and an inner diameter of the through-channel 6 inside the pipe connection 4 to be 4.75 mm, with the use of a heater rod with a diameter of 4 mm a flow cross section results inside the pipe 3 of 15.7 mm$^2$ and a flow cross section in the through-channel 6 of 5.1 mm$^2$. The flow cross section in the through-channel 6 inside the pipe connection 4 thus has only approximately 32% of the area of the flow channel inside the pipe 3.

An annular gap with a thickness of 0.375 mm results between the inner circumferential wall of the pipe connection 4 and the heater 8, when the heater rod 8 is arranged centrally. This annular gap is sufficient to allow a sufficient quantity of urea to pass through the connector. However, in many cases the heater rod 8 will not lie centrally. Due to the sizing shown, the gap between the pipe connection 4 and the heater rod, however, has a maximum thickness of 0.75 mm when the heater rod 8 bears against the inner wall of the pipe connection 4.

Figure 3:
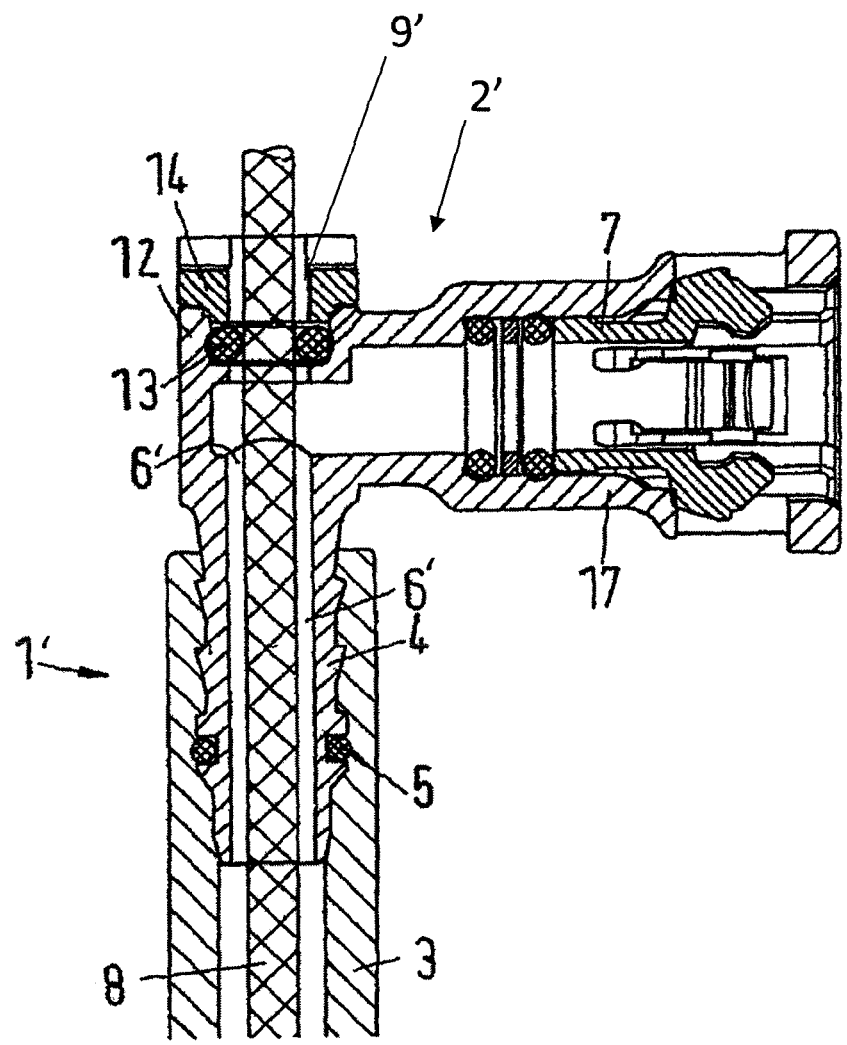
FIG. 3 illustrates a section through a modified embodiment of a connector.

FIG. 3 shows a modified embodiment of a connector 2'. Identical elements and elements with the same function are provided with the same reference numbers as in FIGS. 1 and 2.

While in the embodiment according to FIGS. 1 and 2 the through-channel 6 runs in a straight line (a connector of this type is also referred to as a "0° connector"), the through-channel 6' with the connector 2' according to FIG. 3 has a change of direction by 90°. A connector 2' of this type is also referred to as a "90° connector."

It is also discernible here that the heater rod 8 fills the through-channel 6' in a part of its length such that the flow cross section inside the through-channel 6' is much smaller than the flow channel cross section inside the pipe 3. The heater rod 8 is here guided through the connector 2' in a straight line, i.e., the heater outlet channel 9' continues the pipe connection 4 in a straight line.

The volume not directly heated by the heater rod 8 corresponds essentially to the volume of the connector 2 according to FIGS. 1 and 2.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A fluid line, comprising:
   a pipe;
   a connector having a pipe connection arranged at one end of the pipe, a heater outlet channel, and a through-channel through the connector, wherein the pipe connection surrounds a portion of the through-channel; and
   a heater structured and arranged within the pipe and the connector to heat at least a portion of the pipe and at least a portion of the connector, the heater having a diameter,
   wherein a flow cross section of the through-channel at least on a part of its length is no more than 60% of a flow cross section of the pipe,
   wherein the through channel has a part with a ramp element, and in said part, the through-channel has at least one cross-section having a width that is smaller than the diameter of the heater,
   wherein the heater is embodied as a flexible heater rod that has at least one heating conductor that is embedded in an extruded plastic material,
   wherein the flexible heater rod is arranged passing through the heater outlet channel,
   wherein the flexible heater rod is sealed in the heater outlet channel with an O-ring seal,
   wherein the ramp element is embodied in one piece with the connector, and
   wherein the connector is an injection molded part and the ramp element is injection molded in one piece with the connector.

2. The fluid line according to claim 1, wherein the flow cross section of the through-channel on the part of the length is no more than 50% of the flow cross section of the pipe.

3. The fluid line according to claim 1, wherein the heater rod extends out of the pipe into the pipe connection of the connector and defines the flow cross section at least in the portion of the through-channel surrounded by the pipe connection.

4. The fluid line according to claim 3, wherein the heater rod is embodied in a bendable manner.

5. The fluid line according to claim 3, wherein the heater outlet channel forms an angle unequal to 0° with the through-channel, and wherein the ramp element further comprises:
   a guide surface arranged in the through-channel,
   wherein the guide surface points out of the through-channel to the heater outlet channel, and reduces the cross section of the through-channel on another side of the pipe connection.

6. The fluid line according to claim 5, wherein the ramp element is arranged to span the through-channel in a plane passing through the through-channel and the heater outlet channel, while defining a flow cross-section in the through-channel in a plane perpendicular to the plane passing through the through-channel and the heater outlet channel.

7. The fluid line according to claim 5, wherein the ramp element comprises a width that corresponds to no more than 50% of a largest width of the through-channel in a region of the ramp element.

8. The fluid line according to claim 3, wherein a gap with a maximum extension of 1 mm perpendicular to an axis of the through-channel is defined between a circumferential wall delimiting the through-channel within the pipe connection and the heater rod.

9. The fluid line according to claim 1, wherein the O-ring seal is in direct physical contact with the flexible heater rod and the connector.

10. The fluid line according to claim 1, wherein the flexible heater rod is arranged to pass from the pipe through the pipe connection and through the heater outlet channel, and arranged such that a portion of the flexible heater rod exits from the connector.

11. A method of assembling a fluid line having a pipe, a connector having a pipe connection arranged at one end of the pipe, a heater outlet channel, and a through-channel through the connector, wherein the pipe connection surrounds a portion of the through-channel, and a heater structured and arranged to heat at least a portion of the pipe and at least a portion of the connector, wherein the pipe has a pipe diameter, the through-channel has an inner diameter, and the heater has one of a heater diameter and a heater width, wherein the through channel has a part with a ramp element embodied in one piece with the connector, and in said part, the through-channel has at least one cross-section having a width that is smaller than the one of the heater diameter and the heater width, the method comprising:

selecting at least one of the pipe diameter, the through-channel inner diameter, and the one of the heater diameter and the heater width, such that a flow cross section of the through-channel at least on a part of its length is no more than 60% of a flow cross section of the pipe;

inserting the heater, wherein the heater is embodied as a flexible heater rod that has at least one heating conductor that is embedded in an extruded plastic material, into the through-channel having the part with the ramp element;

arranging the flexible heater rod to pass through the heater outlet channel;

sealing the flexible heater rod in the heater outlet channel with an O-ring seal; and attaching the pipe to the pipe connection, wherein the connector is an injection molded part and the ramp element is injection molded in one piece with the connector.

12. The method of claim 11, wherein the flow cross section of the through-channel on the part of the length is no more than 50% of the flow cross section of the pipe.

13. The method of claim 11, wherein the heater rod extends out of the pipe into the pipe connection of the connector and defines the flow cross section at least in the portion of the through-channel surrounded by the pipe connection.

14. The method of claim 13, wherein the heater rod is embodied in a bendable manner.

15. The method of claim 13, wherein the heater outlet channel forms an angle unequal to 0° with the through-channel and wherein the ramp element further comprises:

a guide surface arranged in the through-channel, wherein the guide surface points out of the through-channel to the heater outlet channel, and reduces the cross section of the through-channel on another side of the pipe connection.

16. The method of claim 15, wherein the ramp element is arranged to span the through-channel in a plane passing through the through-channel and the heater outlet channel, while defining a flow cross-section in the through-channel in a plane perpendicular to the plane passing through the through-channel and the heater outlet channel.

17. The method of claim 15, wherein the ramp element comprises a width that corresponds to no more than 50% of a largest width of the through-channel in a region of the ramp element.

18. The method of claim 11, wherein a gap with a maximum extension of 1 mm perpendicular to an axis of the through-channel is defined between a circumferential wall delimiting the through-channel within the pipe connection and the heater rod.

19. The method of claim 11, wherein the O-ring seal is in direct physical contact with the flexible heater rod and the connector.

20. The method of claim 11, wherein the flexible heater rod is arranged to pass from the pipe through the pipe connection and through the heater outlet channel, and arranged such that a portion of the flexible heater rod exits from the connector.

* * * * *